United States Patent
Chen et al.

(10) Patent No.: US 9,889,724 B2
(45) Date of Patent: Feb. 13, 2018

(54) TRANSPORT REFRIGERATION SYSTEM, TRANSPORT REFRIGERATION UNIT, AND METHODS FOR SAME

(75) Inventors: Yu H. Chen, Manlius, NY (US); Mingfei Gan, Manlius, NY (US)

(73) Assignee: CARRIER CORPORATION, Farmington, CT (US)

( * ) Notice: Subject to any disclaimer, the term of this patent is extended or adjusted under 35 U.S.C. 154(b) by 1212 days.

(21) Appl. No.: 13/382,389

(22) PCT Filed: Jul. 9, 2010

(86) PCT No.: PCT/US2010/041532
§ 371 (c)(1),
(2), (4) Date: Jan. 5, 2012

(87) PCT Pub. No.: WO2011/008649
PCT Pub. Date: Jan. 20, 2011

(65) Prior Publication Data
US 2012/0111044 A1    May 10, 2012

Related U.S. Application Data

(60) Provisional application No. 61/224,994, filed on Jul. 13, 2009.

(51) Int. Cl.
*B60H 1/32* (2006.01)
*F25D 29/00* (2006.01)
(Continued)

(52) U.S. Cl.
CPC ......... *B60H 1/3232* (2013.01); *F25D 29/003* (2013.01); *F25B 2700/21172* (2013.01);
(Continued)

(58) Field of Classification Search
CPC ..... B60H 1/3232; F25D 29/003; F25D 17/06; F25D 2700/16; F25B 2700/21172; F25B 2700/21173
(Continued)

(56) References Cited

U.S. PATENT DOCUMENTS

| 561,986 A | | 6/1896 | Gall | |
| 3,564,864 A | * | 2/1971 | Scrine | G05D 23/275 62/180 |

(Continued)

FOREIGN PATENT DOCUMENTS

| CN | 1146240 A | 3/1997 |
| CN | 1475720 A | 2/2004 |

(Continued)

OTHER PUBLICATIONS

International Preliminary Report on Patentability dated Jan. 26, 2012.

(Continued)

*Primary Examiner* — Len Tran
*Assistant Examiner* — Alexis Cox
(74) *Attorney, Agent, or Firm* — Cantor Colburn LLP (57) ABSTRACT

A transport refrigeration unit controls temperature within a transport refrigeration unit using a remote sensor or sensors. The transport refrigeration unit monitors cargo temperature with remote sensor(s) and air temperature to adjust air delivery speed or cooling capacity. Selected operation parameters are determined with consideration of both energy conservation and/or cargo quality. The transport refrigeration unit controls temperature using a first selected mode of operation or a second mode of operation.

4 Claims, 8 Drawing Sheets

(51) Int. Cl.
*F25B 49/00* (2006.01)
*F25D 17/06* (2006.01)

(52) U.S. Cl.
CPC ..... *F25B 2700/21173* (2013.01); *F25D 17/06* (2013.01); *F25D 2700/16* (2013.01)

(58) Field of Classification Search
USPC .................................. 62/239, 208, 209, 212
See application file for complete search history.

(56) References Cited

U.S. PATENT DOCUMENTS

| | | | |
|---|---|---|---|
| 4,234,926 A * | 11/1980 | Wallace | G01D 9/005 700/2 |
| 4,505,126 A | 3/1985 | Jones et al. | |
| 4,519,215 A | 5/1985 | Barnett | |
| 4,936,104 A * | 6/1990 | Hicke | 62/89 |
| 5,101,643 A | 4/1992 | Hicke | |
| 5,531,264 A * | 7/1996 | Eike | B60H 1/00014 165/42 |
| 5,579,648 A | 12/1996 | Hanson et al. | |
| 5,860,594 A * | 1/1999 | Reason et al. | 236/91 E |
| 5,979,173 A | 11/1999 | Tyree | |
| 5,983,655 A | 11/1999 | Kistner et al. | |
| 6,027,031 A | 2/2000 | Reason et al. | |
| 7,249,921 B2 | 7/2007 | McMahon et al. | |
| 8,590,330 B2 * | 11/2013 | Walker | F25D 29/003 62/236 |
| 8,763,423 B2 | 7/2014 | Tattam | |
| 2003/0000237 A1 * | 1/2003 | Hansen | F25B 1/10 62/228.4 |
| 2003/0024256 A1 | 2/2003 | Hanson | |
| 2004/0065100 A1 * | 4/2004 | Jacobsen | B60H 1/3232 62/228.1 |
| 2004/0172954 A1 | 9/2004 | Hanson et al. | |
| 2006/0181413 A1 | 8/2006 | Mostov | |
| 2006/0219842 A1 | 10/2006 | Shell et al. | |
| 2006/0264221 A1 * | 11/2006 | Koike et al. | 455/456.1 |
| 2007/0022765 A1 * | 2/2007 | Lifson et al. | 62/180 |
| 2007/0185687 A1 | 8/2007 | Speasl et al. | |
| 2007/0267509 A1 | 11/2007 | Witty et al. | |
| 2008/0104976 A1 | 5/2008 | Guglielmetti et al. | |
| 2008/0129493 A1 | 6/2008 | Fuentes et al. | |
| 2008/0262646 A1 | 10/2008 | Breed | |
| 2008/0289354 A1 | 11/2008 | Dudley et al. | |
| 2009/0026263 A1 | 1/2009 | Schmid et al. | |
| 2009/0228155 A1 * | 9/2009 | Slifkin | F25D 29/003 700/299 |
| 2010/0106303 A1 * | 4/2010 | Thogersen | F25D 29/003 700/275 |
| 2011/0193710 A1 | 8/2011 | McIlvain et al. | |
| 2012/0111044 A1 | 5/2012 | Chen Yu et al. | |
| 2012/0137710 A1 * | 6/2012 | Reimann | F24F 13/10 62/89 |
| 2012/0137713 A1 | 6/2012 | Duraisamy et al. | |
| 2012/0198866 A1 * | 8/2012 | Zeidner | F25D 11/003 62/89 |
| 2012/0227427 A1 | 9/2012 | Liu et al. | |
| 2013/0019961 A1 | 1/2013 | Rogers et al. | |
| 2013/0048647 A1 | 2/2013 | Farrar et al. | |
| 2013/0158828 A1 | 6/2013 | McAlister | |
| 2013/0247594 A1 | 9/2013 | Sanders et al. | |
| 2013/0247598 A1 | 9/2013 | Fulmer et al. | |
| 2013/0247599 A1 | 9/2013 | Love et al. | |
| 2013/0340444 A1 | 12/2013 | Bryant et al. | |
| 2014/0144161 A1 | 5/2014 | Pointer et al. | |
| 2014/0170949 A1 | 6/2014 | Dwiggins | |
| 2014/0352913 A1 | 12/2014 | Eowsakul | |
| 2015/0135737 A1 * | 5/2015 | Cresswell | F25D 29/003 62/56 |

FOREIGN PATENT DOCUMENTS

| | | |
|---|---|---|
| CN | 1701205 A | 11/2005 |
| EP | 0235119 A2 | 9/1987 |
| EP | 0495464 | 7/1992 |
| EP | 0602936 | 6/1994 |
| EP | 0962343 | 12/1999 |
| EP | 1152316 A2 | 11/2001 |
| EP | 1667059 A1 | 6/2006 |
| GB | 2254506 | 10/1992 |
| JP | H03181766 A | 8/1991 |
| JP | 6241637 A | 9/1994 |
| JP | 2003214752 | 7/2003 |
| KR | 1003092780000 B1 | 12/2001 |
| WO | 2009073034 A1 | 6/2009 |

OTHER PUBLICATIONS

International Search Report and Written Opinion dated Feb. 24, 2011.
International Search Report and Written Opinion of International Application No. 201200238-2, dated May 13, 2013, 9 pages.
Singapore Examination Report and Search Report for Singapore Patent Application No. 201201134-2, dated Jan. 23, 2014, 9 pages.
Chinese First Office Action and Search Report for application CN 201080031531.7, dated Dec. 10, 2013, 11 pages.
Chinese Second Office Action for application CN 201080031531.7, dated Jul. 10, 2014, 10 pages.
European Search Report for application EP 10800359.1, dated Sep. 21, 2015, 6 pages.
European Search Report for application 16168597.9, dated Oct. 7, 2016, 10 pages.

* cited by examiner

TRANSPORT REFRIGERATION SYSTEM, TRANSPORT REFRIGERATION UNIT, AND METHODS FOR SAME

CROSS REFERENCE TO RELATED APPLICATION

This application claims priority to U.S. Provisional Patent Application Ser. No. 61/224,994 entitled "Transport Refrigeration System, Transport Refrigeration Unit, and Methods for Same," filed on Jul. 13, 2009. The content of this application is incorporated herein by reference in its entirety.

FIELD OF THE INVENTION

This invention relates generally to the field of transport refrigeration systems and methods of operating the same.

BACKGROUND OF THE INVENTION

A particular difficulty of transporting perishable items is that such items must be maintained within a temperature range to reduce or prevent, depending on the items, spoilage, or conversely damage from freezing. A transport refrigeration unit is used to maintain proper temperatures within a transport cargo space. The transport refrigeration unit can be under the direction of a controller. The controller ensures that the transport refrigeration unit maintains a certain environment (e.g., thermal environment) within the transport cargo space.

SUMMARY OF THE INVENTION

In view of the background, it is an object of the application to provide a transport refrigeration system, transport refrigeration unit, and methods of operating same that can maintain cargo quality by selectively controlling transport refrigeration system components.

One embodiment, according to the application can include a control module for a refrigeration system. The control module includes a controller for controlling the refrigeration system based on at least a remote cargo sensor or a sensed temperature for cargo.

In an aspect of the invention, a transport refrigeration unit includes a refrigeration module operatively coupled to an enclosed volume. The refrigeration module includes a supply port to output air to the enclosed volume at a supply temperature, a return port to return air from to the enclosed volume to the refrigeration module at a return temperature, at least one cargo temperature sensor unit to provide a cargo temperature and a controller coupled to regulate the operation of the refrigeration module responsive to the cargo temperature.

In an aspect of the invention, refrigeration module includes a compressor having a discharge port and an input port, a condenser heat exchanger unit operatively coupled to the discharge port, an evaporator heat exchanger unit operatively coupled to the input port, a condenser fan disposed proximate to the condenser heat exchanger unit and an evaporator fan disposed proximate to the evaporator heat exchanger unit, the controller to regulate the operation of the compressor, the condenser fan, and the evaporator fan.

In an aspect of the invention, a refrigeration unit includes a refrigeration module operatively coupled to an enclosed volume. The refrigeration module includes at least one cargo temperature sensor unit to provide a cargo temperature and a controller coupled to operate the refrigeration module in a first mode responsive to the first temperature and the second temperature. The controller operates the refrigeration module in a second mode responsive to the cargo temperature.

In an aspect of the invention, a method of operating a transport refrigeration unit includes determining a remote cargo temperature reading, comparing the remote cargo temperature to a corresponding selected value, entering a power savings mode of the transport refrigeration unit when the remote cargo temperature is less than or equal to the selected value and entering an operations mode of the transport refrigeration unit when the remote cargo temperature is not less than the selected value. In the method, the power saving mode is exited when the remote cargo temperature is not less than the corresponding selected value.

BRIEF DESCRIPTION OF THE DRAWINGS

Novel features that are characteristic of exemplary embodiments of the invention are set forth with particularity in the claims. Embodiments of the invention itself may be best be understood, with respect to its organization and method of operation, with reference to the following description taken in connection with the accompanying drawings in which:

DETAILED DESCRIPTION OF EXEMPLARY EMBODIMENTS

Reference will now be made in detail to exemplary embodiments of the application, examples of which are illustrated in the accompanying drawings. Whenever possible, the same reference numerals will be used throughout the drawings to refer to the same or like parts.

Figure 1:
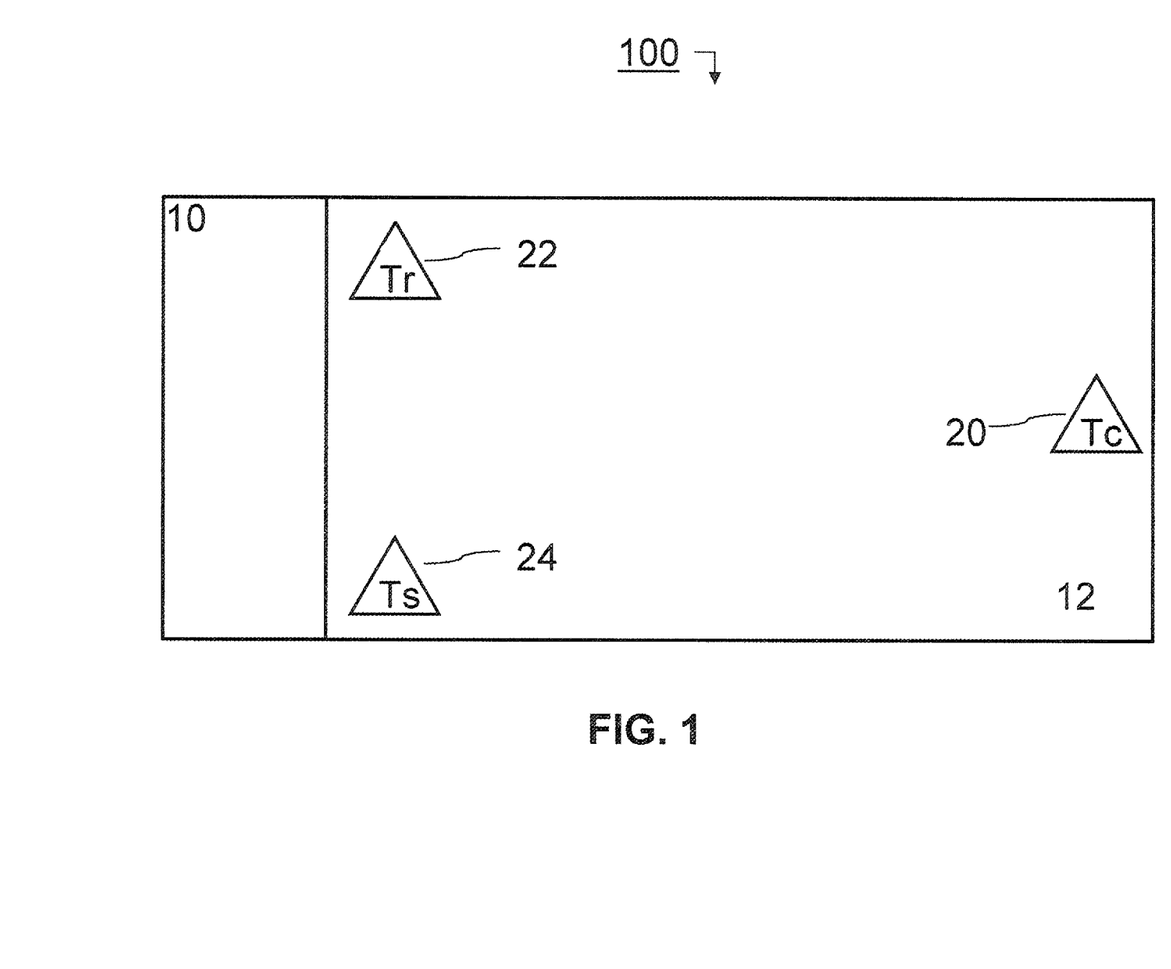
FIG. 1 is a diagram that shows an embodiment of a transport refrigeration system according to the application.

FIG. 1 is a diagram that shows an embodiment of a transport refrigeration system. As shown in FIG. 1, a transport refrigeration system 100 can include a transport refrigeration unit 10 coupled to an enclosed space within a container 12. As shown in FIG. 1, the transport refrigeration unit 10 is configured to maintain a prescribed thermal environment within the container 12 (e.g., cargo in an enclosed volume).

In FIG. 1, the transport refrigeration unit 10 is connected at one end of the container 12. Alternatively, the transport refrigeration unit 10 can be coupled to a prescribed position on a side or more than one side of the container 12. The transport refrigeration unit 10 can operate to induct air at a first temperature and to exhaust air at a second temperature. In one embodiment, the exhaust air from the transport refrigeration unit 10 will be warmer than the inducted air such that the transport refrigeration unit 10 is employed to heat the air in the container 12. In one embodiment, the exhaust air from the transport refrigeration unit 10 will be cooler than the inducted air such that the transport refrigeration unit 10 is employed to cool the air in the container 12. Thus, the transport refrigeration unit 10 can induct air from the container 12 having a return temperature Tr (e.g., first temperature) and exhaust air to the container 12 having a supply temperature Ts (e.g., second temperature).

In one embodiment, the supply temperature Ts and the return temperature Tr were determined using remote sensors 22, 24. Alternatively, the transport refrigeration unit 10 can include one or more temperature sensors to determine and transmit the return temperature Tr and/or the supply temperature Ts.

A transport refrigeration system 100 can provide air with controlled temperature, humidity or/and species concentration into an enclosed chamber where cargo is stored such as in container 12. As known to one skilled in the art, the transport refrigeration system 100 is capable of controlling a plurality of the environmental parameters or all environmental parameters within corresponding ranges with a great deal of variety of cargos and under all types of ambient conditions.

As shown in FIG. 1, a single remote sensor 20 can be put into cargo whose environmental conditions are to be controlled by transport refrigeration unit 10. Alternatively, a plurality of remote sensors can be positioned in the container 12. In one embodiment, the remote sensor 20 can be used to determine a temperature of a cargo in the container 12.

The transport refrigeration system 100 can include additional remote sensor 22 and remote sensor 24 to respectively measure the return air temperature Tr and the supply air temperature Ts (e.g., 24). Remote sensors 20, 22, 24, as known to one skilled in the art, can communicate with main controller through wire or wireless communications. For example, wireless communications can include one or more radio transceivers such as one or more of 802.11 radio transceiver, Bluetooth radio transceiver, GSM/GPS radio transceiver or WIMAX (802.16) radio transceiver. Respective information collected by remote sensor(s) can be used as input parameters (e.g., by a controller) to control various components in transport refrigeration unit 10. In one embodiment, remote sensors 20, 22, 24 can monitor additional criteria such as humidity, species concentration or the like.

In one embodiment, the remote sensor 20 can be for cargo temperature Tc and can be located at a point spaced apart from the remote sensor 24 providing the supply temperature Ts. For example, when transport refrigeration unit 10 provides a bottom front delivery system for supply air in the container 12, a location for a single remote sensor 20 is rear top position in the container 12. Alternatively, when transport refrigeration unit 10 provides a top front delivery arrangement for supply air (e.g., truck), then a single remote cargo sensor 20 can be located at a rear bottom location. In one embodiment, the remote sensor 20 can be provided at a position in the container 12 furthest from a supply duct for the transport refrigeration unit 10.

Figure 8:
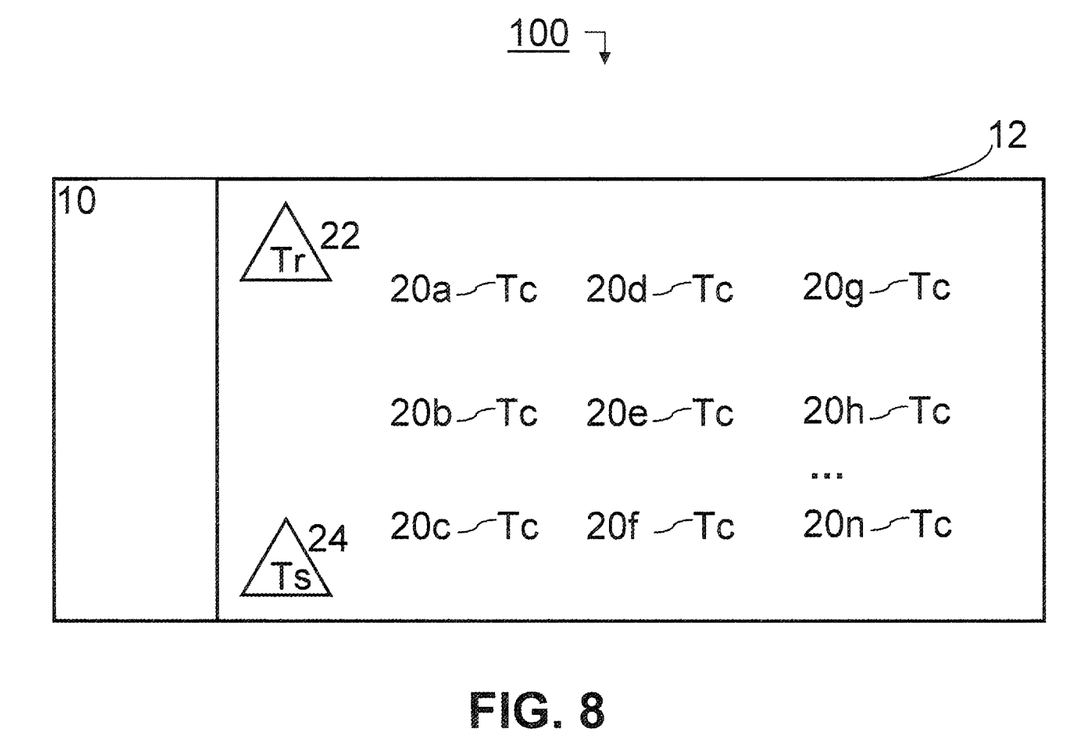
FIG. 8 is a diagram that illustrates a plurality of sensors in a refrigerated transport container.

As shown in FIG. 8, in one embodiment, a plurality of remote sensors 20' (20a, 20b, 20c, . . . , 20n) can be put into the container 12 to measure cargo temperature for cargo whose environmental conditions are to be controlled by transport refrigeration unit 10. For multiple remote sensors 20' (20a, 20b, 20c, . . . , 20n), each of the sensors 20' can be independently or directly coupled in communication with transport refrigeration unit 10. However, embodiments according to the application are not intended to be so limited as other connection configurations for the remote sensors 20' can be used. For example, each sensor's physical location for multiple remote sensors 20a, 20b, 20c, . . . , 20n may be mapped out by peer-to-peer communication, and a single one of the sensors 20' (e.g., 20c) can collect and communicate information from all sensors 20' to the transport refrigeration unit 10.

Figure 2:
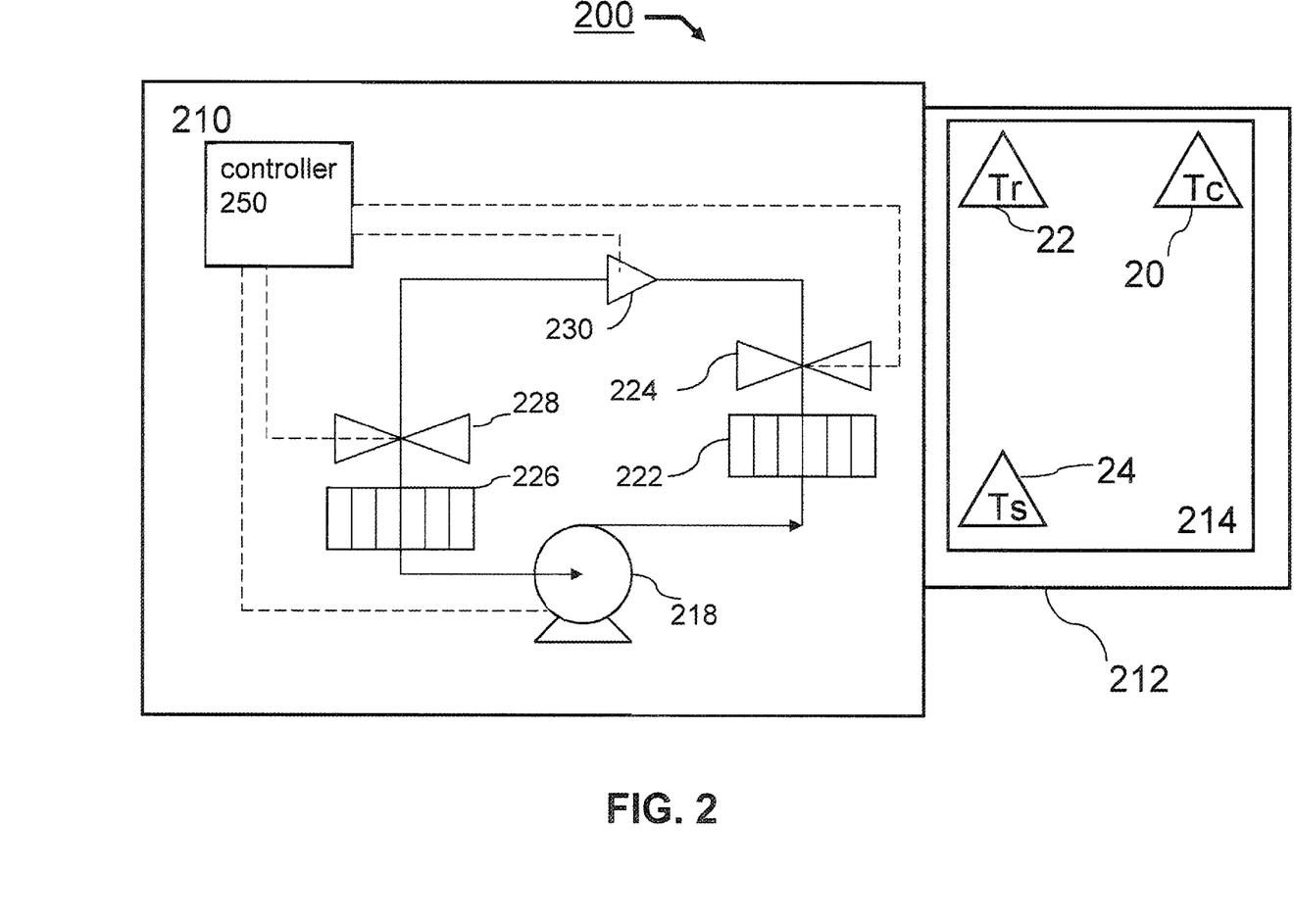
FIG. 2 is a diagram that shows another embodiment of a transport refrigeration system according to the application.

For multiple cargo temperature sensors, various locations may be used. For example, randomly distributed locations for the remote cargo sensors 20' can be used. Alternatively, the remote cargo sensors 20' can be evenly distributed throughout loaded cargo or at a periphery of loaded cargo. Further, the remote cargo sensors 20' can be in direct contact with, embedded within (e.g., entirely or a probe portion), or indirectly attached (slightly spaced from) to actual cargo. In one embodiment, at least one sensor of the plurality of sensors 20' is located at farthest point spaced away from the supply duct or the remote sensor 24 for the supply temperature Ts. In one embodiment at least one sensor of the plurality of sensors 20' is location at an elevated position above the floor of the container 12 at farthest point spaced away from the supply duct where actual cargo is loaded FIG. 2 is a diagram that shows an embodiment of a transport refrigeration system. As shown in FIG. 2, a transport refrigeration system 200 can include a refrigeration module 210 coupled to a container 212, which can be used with a trailer, an intermodal container, a train railcar or the like, used for the transportation or storage of goods requiring a temperature controlled environment, such as, for example foodstuffs and medicines (e.g., perishable or frozen). The container 212 can include an enclosed volume 214 for the transport/storage of such goods. The enclosed volume 214 may be an enclosed space having an interior atmosphere isolated from the outside (e.g., ambient atmosphere or conditions) of the container 212.

The refrigeration module 210 is located so as to maintain the temperature of the enclosed volume 214 of the container 212 within a predefined temperature range. In one embodiment, the refrigeration module 210 can include a compressor 218, a condenser heat exchanger unit 222, a condenser fan 224, an evaporation heat exchanger unit 226, an evaporation fan 228, and a controller 250.

The compressor 218 can be powered by three phase electrical power, and can, for example, operate at a constant speed. The compressor 218 may be a scroll compressor, such as, for example a scroll compressor available from Carrier Corporation of Syracuse, N.Y., USA. The transport refrigeration system 200 requires electrical power from, and can be connected to a power supply unit (not shown) such as a normal commercial power service, an external power generation system (e.g., shipboard), a generator (e.g., diesel generator) or the like.

The condenser heat exchanger unit 222 can be operatively coupled to a discharge port of the compressor 218. The evaporator heat exchanger unit 226 can be operatively coupled to an input port of the compressor 218. An expansion valve 230 can be connected between an output of the condenser heat exchanger unit 222 and an input of the evaporator heat exchanger unit 226.

The condenser fan 224 can be positioned to direct an air stream onto the condenser heat exchanger unit 222. The air stream from the condenser fan 224 can allow heat to be removed from the coolant circulating within the condenser heat exchanger unit 222.

The evaporator fan 228 can be positioned to direct an air stream onto the evaporation heat exchanger unit 226. The evaporator fan 228 can be located and ducted so as to circulate the air contained within the enclosed volume 214 of the container 212. In one embodiment, the evaporator fan 230 can direct the stream of air across the surface of the evaporator heat exchanger unit 226. Heat is thereby removed from the air, and the reduced temperature air can be circulated within the enclosed volume 214 of the container 212 to lower the temperature of the enclosed volume 214.

The controller 250 such as, for example, a MicroLink™ 21 controller available from Carrier Corporation of Syracuse, N.Y., USA, can be electrically connected to the compressor 218, the condenser fan 224, and/or the evaporator fan 228. The controller 250 can be configured to operate the refrigeration module 210 to maintain a predetermined environment (e.g., thermal environment) within the enclosed volume 214 of the container 212. The controller 250 can maintain the predetermined environment by selectively controlling operations of the refrigeration module 210 or by controlling one or more components of a transport refrigeration system. In one embodiment, the controller 250 can generate and/or maintain the predetermined environment by selectively controlling operations of the compressor 218, the condenser fan 224, and the evaporator fan 228. For example, if increased cooling of the enclosed volume 214 is required, the electronic controller 250 can increase electrical power to the compressor 218, the condenser fan 224, and the evaporator fan 228. In one embodiment, an economy mode of operation of the refrigeration module 210 can be controlled by the controller 250. In another embodiment, variable speeds of components of the refrigeration module 210 can be adjusted by the controller 250. In another embodiment, a full cooling mode for components of the refrigeration module 210 can be controlled by the controller 250. In one embodiment, the controller 250 can adjust a flow of coolant supplied to the compressor 216.

An embodiment of a method of operating a transport refrigeration system according to the application will now be described. The method embodiment shown in FIG. 3, can be implemented in and will be described using a transport refrigeration system embodiment shown in FIG. 2, however, the method embodiment is not intended to be limited thereby.

Figure 3:
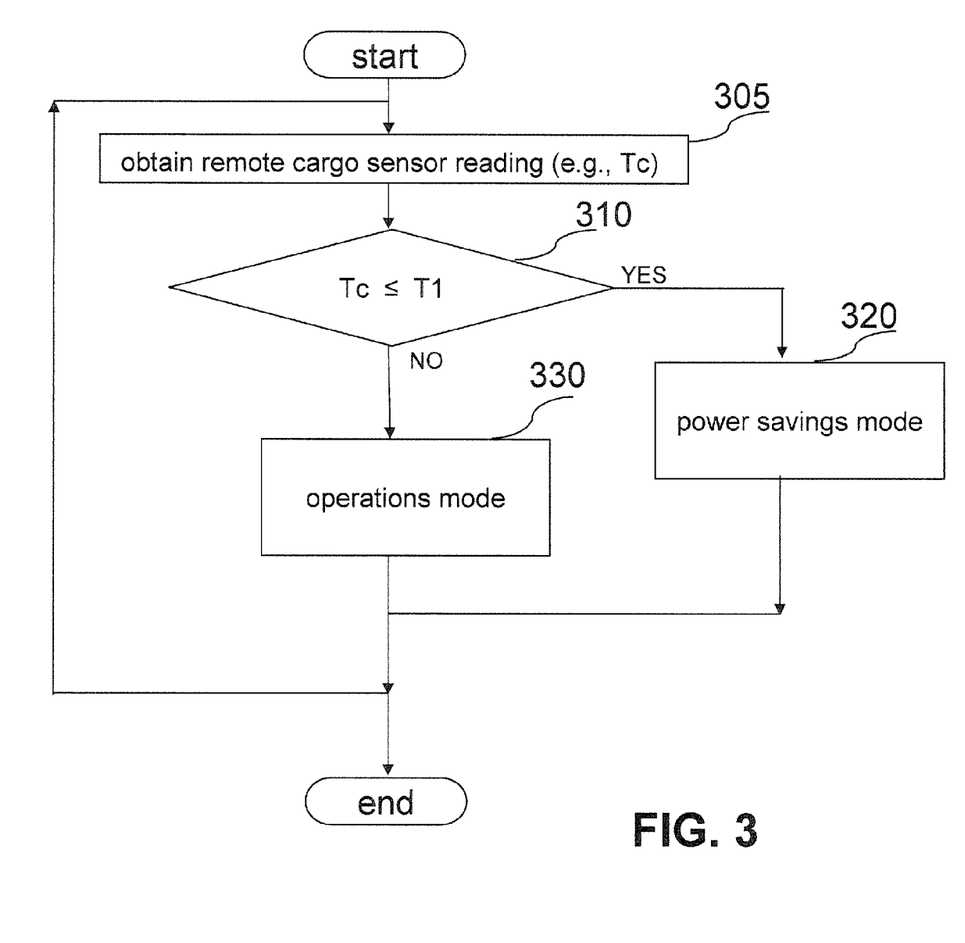
FIG. 3 is a flowchart that shows an embodiment of a method of operating a transport refrigeration system according to the application.

As shown in FIG. 3, after a process starts, a remote cargo sensor reading such as temperature (e.g., Tc) is obtained (operation block 305). Then, the remote cargo sensor reading can be compared to a corresponding selected value or range (e.g., temperature T1) (operation block 310). In one embodiment, when the remote cargo sensor reading is less than or equal to the selected value or within a selected range, a power savings mode of a transport refrigeration system is entered (operation block 320). Otherwise, an operations mode that is not a power savings mode such as a full cool mode is entered (operation block 330). From either operations block 320 or operations block 330, control can jump back to repeatedly obtain and compare the remote cargo sensor reading (operations blocks 305, 310) until the process ends.

An embodiment of a method of operating a transport refrigeration system according to the application will now be described. The method embodiment shown in FIG. 4, can be implemented in and will be described using a transport refrigeration system embodiment shown in FIG. 2, however, the method embodiment is not intended to be limited thereby.

Figure 4:
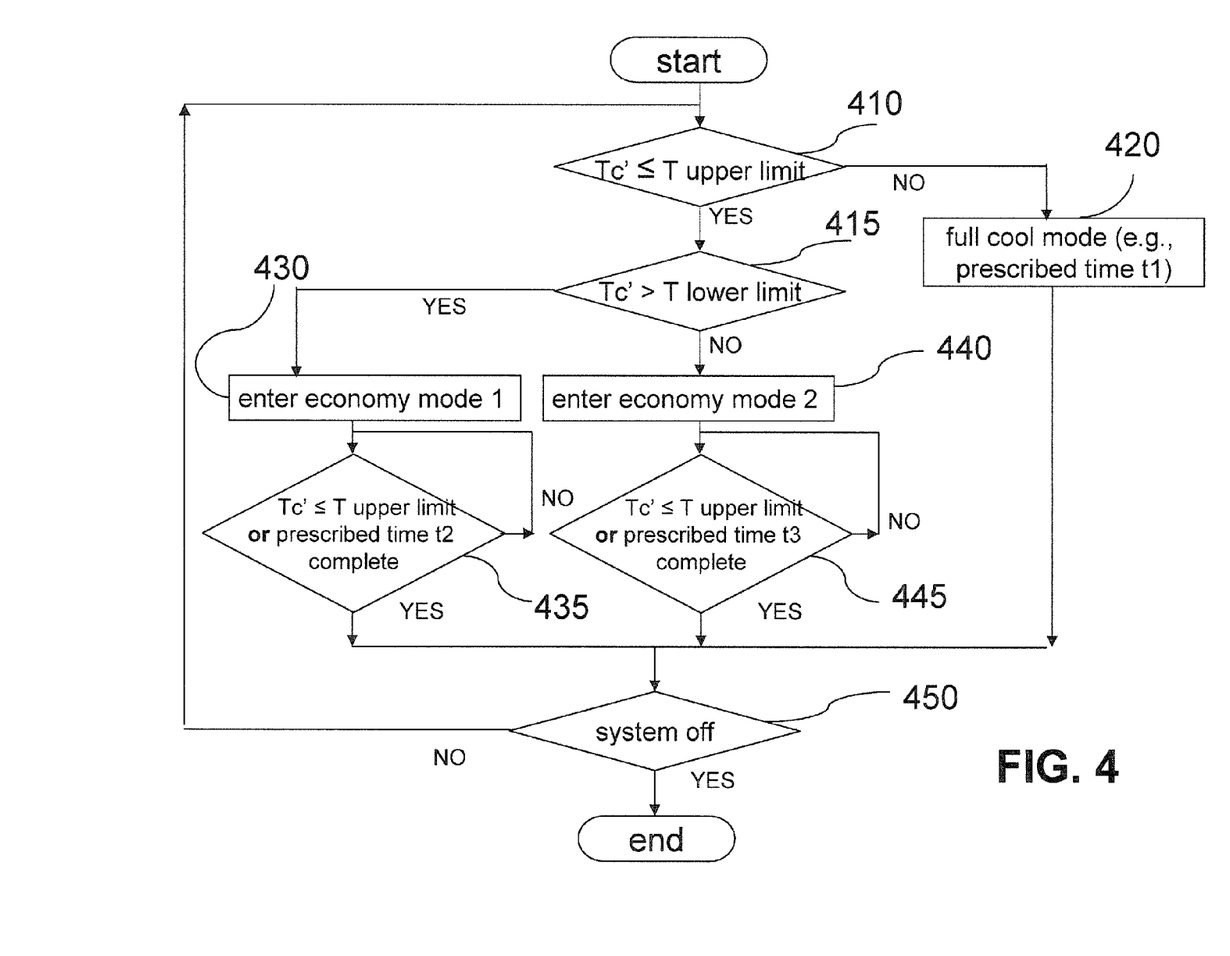
FIG. 4 is a flowchart that shows another embodiment of a method of operating a transport refrigeration system according to the application.

As shown in FIG. 4, after a process starts, a remote cargo sensor temperature Tc' such as cargo temperature Tc can be compared to a corresponding upper limit of a temperature range (T upper limit) (operation block 410). When the remote cargo sensor reading is not less than or equal to the T upper limit value, a cooling mode of a transport refrigeration module 210 such as a full cool mode is entered (operation block 420). In one embodiment, the cooling mode is entered for a first prescribed time t1. Alternatively, the full cool mode can be entered for a prescribed temperature drop in a monitored temperature (e.g., Tc, Tr, Tr–Ts). Then, the remote cargo sensor temperature Tc such can be compared to a corresponding lower limit of the temperature range (T lower limit) (operation block 415). When the remote cargo sensor reading is greater than the T lower limit value, a first economy mode of the transport refrigeration module 210 can be entered (operation block 430). In one embodiment, the first economy mode is entered for a second prescribed time t2. In the first economy mode, when an elapsed time is determined to be greater than the second prescribed time t2 or a current remote cargo sensor temperature Tc' is determined to be greater than T upper limit, the first economy mode can be exited (operation block 435).

When the remote cargo sensor reading is determined to be less than the T lower limit value (operation block 415), a second economy mode of the transport refrigeration module 210 can be entered (operation block 440). In one embodiment, the second economy mode is operated for a third prescribed time t3. In the second economy mode, when an elapsed time is determined to be greater than the third prescribed time t3 or a current remote cargo sensor temperature Tc' is determined to be greater than T upper limit, the second economy mode can be exited (operation block 445).

From either operations block 435 or operations block 445, when it is determined that the refrigeration module is operating, control can jump back to operation block 410. Otherwise, the process can end (operation block 450). In the embodiment of a method of operating a transport refrigeration unit of FIG. 4, the remote cargo sensor reading can be repeatedly compared to a selected operating temperature range. Further, the remote cargo sensor reading can be determined, for example, periodically, aperiodically, repeatedly, or checked once per second while operating in an economy mode (e.g., the first economy mode or the second economy mode). Accordingly, embodiments of the application can utilize cargo characteristics to conserve energy or power by operating in an economy mode while reducing or preventing damage (e.g., spoilage) to cargo such as perishable goods in transit.

In the embodiment of FIG. 4, the first economy mode or the second economy mode can be different modes of operating the refrigeration module 210. Alternatively, the first and second economy modes could be the same mode. Further, the prescribed time periods t1, t2, t3 can have differing values such as t1<t2<t3, however, embodiments are not intended to be so limited. For example, prescribed time periods t1, t2 and t3 may have equal values.

In operation, the controller 250 can control the refrigeration module 210 or a selected set of components thereof (e.g., the compressor 218, the condenser fan 228, and the evaporator fan 230) to be in at least a first mode or a second mode of operation. In one embodiment, the controller 250 can control operations based on at least the temperature of cargo in the container 212 in the first mode, and control operations based on at least the supply temperature Ts and the return temperature Tr in the second mode.

During operations of exemplary embodiments of a transport refrigeration system according to the application, dependent on cargo loading pattern, ambient conditions and/or cargo respiration heat, there are two (2) conditions of temperature relationships where a cargo temperature Tc can preferably or can accurately control conditions in the container 212 (e.g., a first mode). In one condition, when Ts<Tc<Tr, the cooling and delivery capacity are sufficient to create uniform distribution and the first mode can be used.

In another condition, when Ts<Tr and $|Tr-Tc|<K_{tolerance}$), the cooling and delivery capacity are sufficient to create uniform distribution. In this case, Tr is approximately equal to ($\approx$) Tc because $K_{tolerance}$ is a small. For example, $K_{tolerance}$ can be a constant such as 2° C., 1° F., 0.5° C., or 0.25° F. When Tc is between Ts and Tr (or Tc is slightly higher than Tr), the cooling and delivery capacity are sufficient to create uniform distribution and the first mode of operation can be selected. In the first mode, the refrigeration module 210 can switch to operate in a power savings mode. In one embodiment, the controller 250 can reduce evaporator fan speed from high to low and the controller 250 can continue to monitor Tc in the first mode. In one embodiment, the controller 250 can continue to monitor Ts, Tc, and Tr to make sure that condition 1 or condition 2 is satisfied. While condition 1 or condition 2 are satisfied, low speed evaporator fan mode can be maintained until either (or both conditions) condition becomes unsatisfied.

In one embodiment, when Tc is selected or determined to be representative based on Tc, Tr, and Ts comparisons (e.g., conditions 1 and 2), Tc can be controlled at or based on a set point SP. When Tc becomes Tlim,up+SP, an economy mode can be terminated, and a cooling mode can be entered. For example, the compressor 218 can be energized in the cooling mode. When Tc becomes SP-Tlim,low, the cooling mode can be terminated, and the economy mode can be entered. For example, in the economy mode, the fan (e.g., condenser fan 224 and/or evaporator fan 228) can be operated at a low speed and the compressor (e.g., the condenser fan 224 and the compressor 222) can be off. In this example, Tlim,up and Tlim, low can be rising and lowering temperature error values, respectively.

Figure 6:
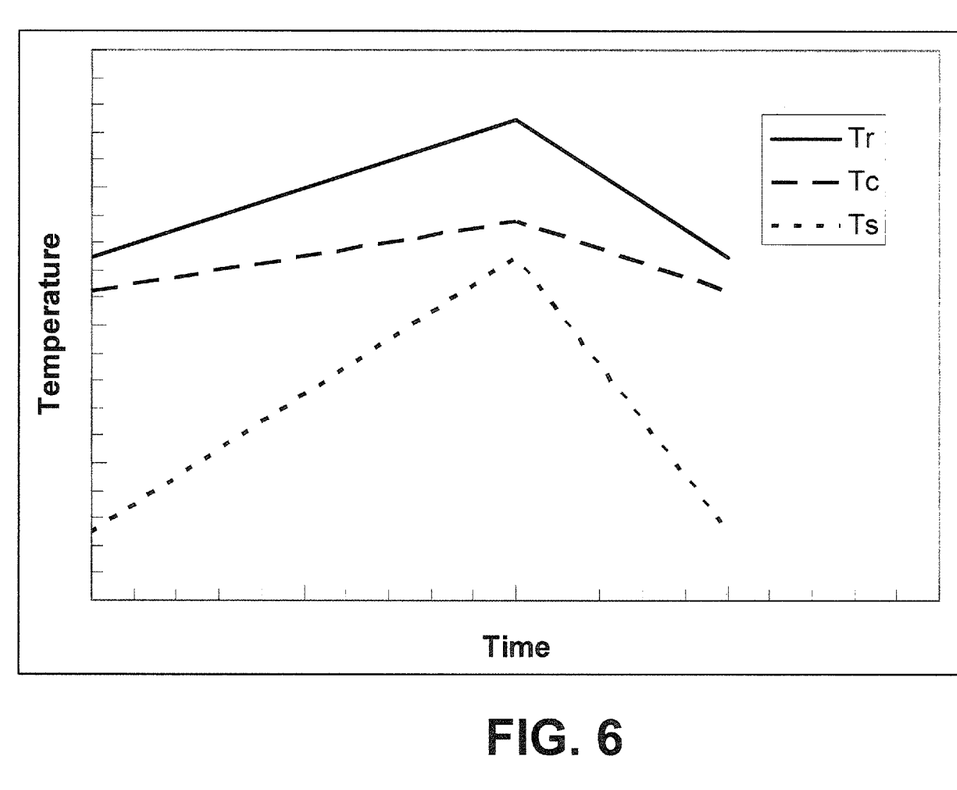
FIG. 6 is a diagram that shows exemplary temperature profiles with respect to time.

FIG. 6 is a diagram that shows exemplary temperature profiles with respect to time. For desired or ideal packing and cargo loading, cargo temperature Tc is bound between the return air temperature Tr and the supply air temperature Ts. As shown in FIG. 6, Tc has flatter slope compared to Ts and Tr because of greater heat capacity of cargo relative to air. Thus, when Tc can be used to control operations of the refrigeration module 210, an increased accuracy (e.g., less variability) can result in improved transport conditions and/or decreased energy consumption.

Figure 7:
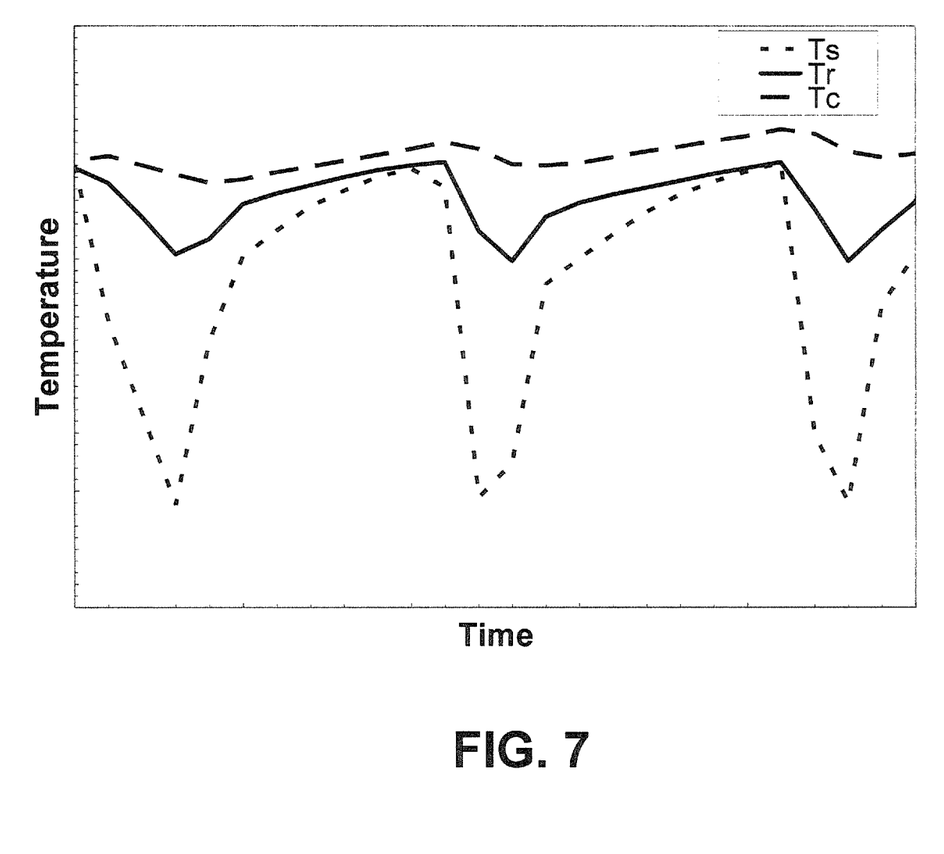
FIG. 7 is a diagram that shows additional exemplary temperature profiles with respect to time.

FIG. 7 is a diagram that shows additional exemplary temperature profiles with respect to time. As shown in FIG. 7, experimental data illustrate temperature profiles with the cargo temperature Tc remaining relatively flat compared to fluctuations of the return air temperature Tr and the supply air temperature Ts. As shown in FIG. 7, the cargo temperature Tc did remain bounded by the return air temperature Tr and the supply air temperature Ts during the experimental period.

In a second mode, the controller 250 can control operations of the refrigeration module 210 based on the return air temperature Tr and the supply air temperature Ts as known to one skilled in the art.

Figure 5:
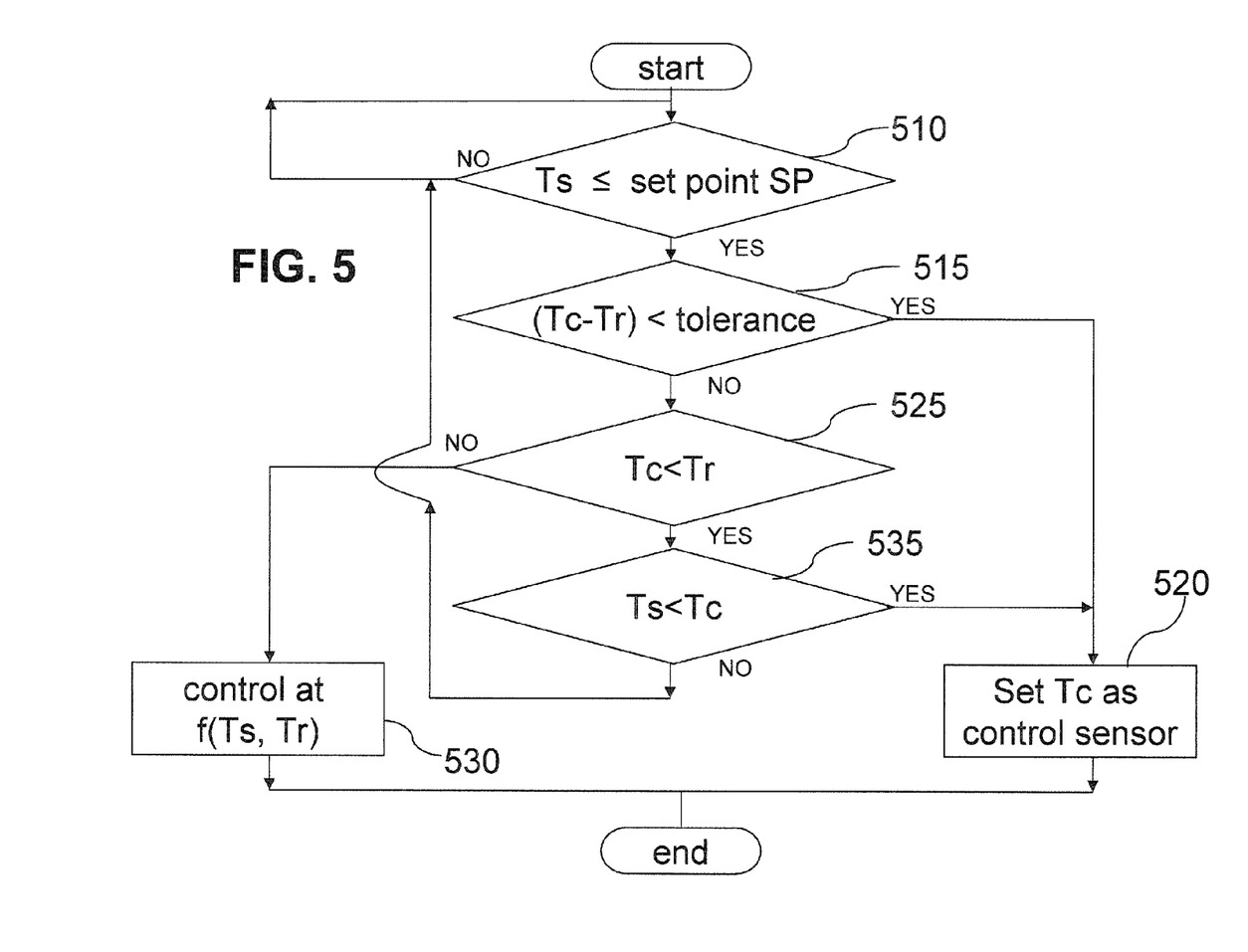
FIG. 5 is a flowchart that shows an embodiment of a method of selecting control parameters for operating a transport refrigeration system according to the application.

FIG. 5 is a flowchart that shows an embodiment of a method of selecting control parameters for operating a transport refrigeration system according to the application.

As shown in FIG. 5, after a process starts, the supply temperature is monitored until it drops to a set point SP temperature (operation block 510). For example, the refrigeration module 210 can operate in a cooling mode while repeatedly or periodically checking whether the supply temperature Ts is less than equal to the SP temperature.

Determining whether the supply temperature Ts≤the SP temperature is one exemplary way to judge that the refrigeration module 210 is operating accurately. After it is determined the refrigeration unit is operating properly (e.g., after operation block 510), a control parameter for the refrigeration module can be determined. In one embodiment, the control parameter can be selected between (a) the supply temperature Ts and the return temperature Tr or (b) the cargo temperature. The cargo temperature Tc can be compared to the return temperature Tr to decide whether these two values are close together by checking if |Tr-Tc|<a tolerance value (operation block 515). When a result of operation block 515 is affirmative, the control parameter for the controller 250 can be at least the cargo temperature Tc (operation block 520). When a result of operation block is negative, the cargo temperature Tc can be compared to the return temperature Tr to judge whether Tc<Tr (operation block 520). When a result of operation block 525 is negative, the control parameter for the controller 250 can be the supply and return temperatures Ts, Tr (operation block 530).

When a result of operation block 525 is affirmative, the supply temperature Ts and the cargo temperature Tc can be compared to determine whether Ts<Tc (operation block 535). When a result of operation block 535 is affirmative, the control parameter for the controller 250 can be at least the cargo temperature Tc (operation block 520). When a result of operation block 535 is negative, operations of the sensors are checked and control jumps back to operation block 510. Alternatively, when a result of operation block 535 is negative, an indeterminate condition (e.g., caused by low air flow) or an error condition can be notified to the controller 250 and/or an operator.

In one embodiment, when the control parameter is the cargo temperature, control based on cargo temperature may allow the refrigeration module 210 to maintain cargo temperature Tc (e.g., within a tolerance) instead of maintaining air temperature. Control based on cargo temperature Tc can dramatically reduce fuel usage while preserving cargo quality.

In one embodiment of the refrigeration unit 10 (e.g., as shown in FIG. 2), the condenser fan 224 is replaced by a first circulating fluid heat exchanger 102 and the evaporator fan 228 is replaced by a second circulating fluid heat exchanger 104. The first circulating fluid heat exchanger 102 can be thermally coupled to the condenser heat exchanger unit 222 to remove heat from the coolant and transfer the heat to a second circulating fluid. The second circulating fluid heat exchanger 104 can be thermally coupled to the evaporator heat exchange unit 226 to transfer heat from a third circulating fluid within the second circulating fluid heat exchanger 104 to the coolant within the evaporator heat exchange unit 226.

Although embodiments of the application have described the remote cargo sensor as capable of monitoring temperature of the cargo (e.g., directly or indirectly), embodiments of the application are not intended to be so limited. For example, the remote cargo sensor may monitor other transport container characteristics such as humidity, species concentration (e.g., $O_2$, $CO_2$, ethanol, $N_2$, or the like), cargo respiration, or similar ambient conditions outside the container. Such monitoring can result in controlling (e.g., by the controller 250 or refrigeration module 210) the monitored characteristic to be below a selected value or within a selected range as known to one skilled in the art. For example, if a $CO_2$ level were too high in the container, outside atmosphere can replace a portion of the enclosed volume of air to reduce the $CO_2$ level until it is considered appropriate again.

Descriptions of an economy mode of operation of a component of the transport refrigeration system 100, a component of the refrigeration module 210 or controlled by the controller 250 have been variously described herein. Embodiments of the application are not intended to be limited to a specific or single economy mode of operation, but are intended to include modes that reduce energy or power consumption such as but not limited to (i) operating only the evaporation fan 228 and operating the evaporation fan at a reduced speed, (ii) operating the evaporation fan 228, the condenser fan 224 and compressor 218 at a reduced or low speed, (iii) operating the evaporation fan 228, the condenser fan 224 and compressor 218 individually or in combination at a variable speed; (iv) turning off the refrigeration module 210 or turning off the evaporation fan 228, the condenser fan 224 and compressor 218, (v) etc.

According to embodiments of the application, a remote cargo sensor value is input to the transport refrigeration system 200, the transport refrigeration module 210 or the controller 250 to control operations of at least one component of the transport refrigeration system responsive to the received or input remote cargo sensor value to reduce power consumption or provide improvement in transport conditions for cargo.

Embodiments of the application have been described herein with reference to a heat evaporation type heat exchanger. However, embodiments of the application are not intended to be so limited. For example, embodiment of the application may be configured to use a heat absorption type heat exchanger.

The transport refrigeration system 100 illustrated in the figures may be of the type commonly employed on refrigerated trailers and/or for use with containers 12. Exemplary containers 12 described herein may be towed by a semi-truck for road transport. However, those having ordinary skill in the art will appreciate that an exemplary container according to the application is not limited to such trailers and may encompass, by way of example only and not by way of limitation, trailers adapted for piggy-back use, railroad cars, and container bodies contemplated for land and sea service.

With the increase of fuel cost, there is increasing demand to reduce or minimize power consumption without compromising cargo quality. In the related art, temperature control can be determined by return and/or supply air sensors. Usually, specific heat of cargo is greater than air, therefore cargo temperature can change slower than air temperature (e.g., supply and return air temperatures). Control based on cargo temperature according to embodiments of the application may allow unit start/stop to maintain/monitor cargo temperature within tolerance instead of maintaining/monitoring air temperature. This can dramatically reduce fuel usage while preserving cargo quality.

While the present invention has been described with reference to a number of specific embodiments, it will be understood that the true spirit and scope of the invention should be determined only with respect to claims that can be supported by the present specification. Further, while in numerous cases herein wherein systems and apparatuses and methods are described as having a certain number of elements it will be understood that such systems, apparatuses and methods can be practiced with fewer than the mentioned certain number of elements. Also, while a number of particular embodiments have been set forth, it will be understood that features and aspects that have been described with reference to each particular embodiment can be used with each remaining particularly set forth embodiment.

We claim:

1. A transport refrigeration unit for regulating the temperature of an enclosed volume, the transport refrigeration unit comprising:
   a refrigeration module operatively coupled to said enclosed volume, said refrigeration module including:
   a supply port to output air to said enclosed volume at a supply temperature;
   a return port to return air from said enclosed volume to the refrigeration module at a return temperature;
   a cargo temperature sensor unit to provide a cargo temperature;
   a supply air temperature sensor;
   a return air temperature sensor; and
   a controller coupled to the cargo temperature sensor unit, the supply air temperature sensor, and the return air temperature sensor, wherein the controller is configured to:
   in response to the cargo temperature satisfying $Ts<Tc<Tr$, where Ts is said supply temperature, Tr is said return temperature, and Tc is said cargo temperature, control said refrigeration module using said cargo temperature as a control parameter;
   in response to said cargo temperature being greater than said return temperature, control said refrigeration module using said supply temperature and said return temperature as control parameters.

2. The transport refrigeration unit of claim 1, wherein said cargo temperature sensor unit is positioned at a cargo position.

3. The transport refrigeration unit of claim 1, said cargo temperature sensor unit is wirelessly connected to the controller.

4. The transport refrigeration unit of claim 1, said refrigeration module including:
   a compressor having a discharge port and an input port;
   a condenser heat exchanger unit operatively coupled to said discharge port;
   an evaporator heat exchanger unit operatively coupled to said input port;
   a condenser fan disposed proximate to said condenser heat exchanger unit; and
   an evaporator fan disposed proximate to said evaporator heat exchanger unit, said controller to regulate the operation of said compressor, said condenser fan, and said evaporator fan.

* * * * *